United States Patent [19]

Ito et al.

[11] Patent Number: 4,545,331
[45] Date of Patent: Oct. 8, 1985

[54] AUXILIARY AIR SUPPLY APPARATUS FOR AN INTERNAL COMBUSTION ENGINE

[75] Inventors: Masafumi Ito, Yokosuka; Shuichi Nishimura, Yokohama; Yoichi Hara, Hiratsuka, all of Japan

[73] Assignee: Nissan Motor Co., Ltd., Yokohama, Japan

[21] Appl. No.: 619,199

[22] Filed: Jun. 11, 1984

[30] Foreign Application Priority Data

Jun. 15, 1983 [JP] Japan ................. 58-107263

[51] Int. Cl.⁴ ............................................ F02M 35/00
[52] U.S. Cl. .................... 123/26; 123/52 M; 123/55 VS
[58] Field of Search ............... 123/26, 52 M, 52 MV, 123/52 MB, 55 VF, 55 VS, 55 VE, 585–589, 52 MC

[56] References Cited

U.S. PATENT DOCUMENTS 1,980,778 11/1934 Bachle ............................ 123/52 M
2,080,293 5/1937 Whatmough ................ 123/52 MB
2,740,389 4/1956 Reyl ................................ 123/52 M

FOREIGN PATENT DOCUMENTS 1153559 5/1969 United Kingdom ............ 123/52 M

Primary Examiner—Craig R. Feinberg
Assistant Examiner—David A. Okonsky
Attorney, Agent, or Firm—Schwartz, Jeffery, Schwaab, Mack, Blumenthal & Evans

[57] ABSTRACT

In a V-type internal combustion engine, an auxiliary air supply apparatus includes an auxiliary air distribution pipe which communicates directly to two or more mutually independent chambers in the intake system of the engine. This auxiliary air distribution pipe is connected and communicates to an auxiliary air channel so as to bypass an intake throttle valve. In this auxiliary air channel an auxiliary air control valve is installed to control the volume of auxiliary air flowing through the channel, according to the operating condition of the engine. Because of this, the auxiliary air controlled by the control valve is directly distributed to two or more chambers through the auxiliary air distribution pipes.

18 Claims, 6 Drawing Figures

AUXILIARY AIR SUPPLY APPARATUS FOR AN INTERNAL COMBUSTION ENGINE

BACKGROUND OF THE INVENTION

1. Field of the Invention

The present invention relates to an auxiliary air supply apparatus for an internal combustion engine for motor vehicles or the like, more specifically an intake manifold in the internal combustion engine having a collector section with an improved auxiliary distributor therein.

2. Description of the Prior Art

In an internal combustion engine, when a number of auxiliary apparatus, such as an air conditioner, are put into operation during engine idling, the volume of idling air is inclined to be inadequate. Accordingly, in order to supplement the inadequate volume of air during the engine idling, other means are adapted to supply auxiliary air to the engine.

However, in the internal combustion engine having two intake chambers each communicating with a group of cylinders, e.g. V-type internal combustion engine, the distribution of the auxiliary air to the groups of cylinders is inclined to be uneven. Specifically, as shown in FIGS. 1 and 2, in a conventional V-type combustion engine, multiple units of branched pipes 9 connected to each cylinder are divided into two groups, corresponding to the two groups of cylinders. The internal section of a collector section 4 in an intake manifold 3 which is provided in the downstream side of an intake throttle valve, corresponding to the branched pipes 9 which are divided into two groups, is also divided into chambers 4A and 4B by a partition 11 with a balancing hole 12. An auxiliary air channel 5 bypasses a throttle chamber 1 and throttle valve equipped with an intake duct 2. This auxiliary air channel 5 has an inlet which communicates to the intake duct 2 in the upstream side of the intake throttle valve, and an outlet 10 which communicates to the collector section 4.

Partway into this auxiliary air channel 5, an auxiliary air control solenoid valve 6 is provided for controlling the volume of the flow of auxiliary air in the channel 5 according to the running status of the internal combustion engine and the status of the vehicle. In addition, the collector section 4 and the cylinder of the engine are communicated each other by means of branched pipes 9. A control circuit 7 is adapted to controls either the degree of opening of the auxiliary air control valve 6 or the time that the valve is opened, based on the engine RPM detected by means of a crank angle sensor 8, to maintain a prescribed idling RPM of the engine when the engine is idling. Furthermore, when auxiliary equipment such as air conditioning and power steering devices are running, and when the headlights are used, or, in other words, when the load on the engine is increased the control circuit 7 controls the auxiliary air control valve 6 so as to increase the volume of auxiliary air.

In this type of conventional auxiliary air supply apparatus, the downstream end of the auxiliary air channel 5 takes place at only the auxiliary air feed outlet 10 in the collector section 4 of the intake manifold 3, and the auxiliary air passing through the auxiliary air channel 5 is supplied through the auxiliary air feed outlet 10 in the collector section 4 of the intake manifold 3. For this reason, when a conventional auxiliary air supply apparatus mentioned above is used in an internal combustion engine having two intake chambers, the following type of problems are produced.

The auxiliary air passes through the auxiliary air supply outlet port 10 and first feeds the first chamber 4A, then passes through the balancing hole 12 of the partition 11 and is supplied into the second chamber 4B. For this reason only a small volume of auxiliary air is fed into the second chamber 4B in the collector section 4, as compared to that fed to the first chamber 4A. Therefore, the distribution of the auxiliary air to the cylinders is uneven. This means that the ratio of the mixture and the distribution of the exhaust recycle gas are non-uniform, and that operating conditions and fuel costs, etc., deteriorate.

SUMMARY OF THE INVENTION

The object of the present invention is to provide an auxiliary air supply apparatus which is capable of improving the operation, fuel costs, and exhaust gas emmissions of an internal combustion engine.

A further object of the present invention is to provide an auxiliary air supply apparatus which is capable of distributing auxiliary air uniformly into cylinders.

A still further object of the present invention is to provided an auxiliary air supply apparatus which is capable of distributing intake air uniformly into each cylinder during low load.

A still further object of the present invention is to provide an auxiliary air supply apparatus which is capable of directly supplying auxiliary air to two or more chambers within the collector section of the intake manifold.

Briefly described, these and other objects of the present invention are accomplished by the provision of an improved auxiliary air supply apparatus which includes an auxiliary air distribution pipe which communicates directly to two or more mutually independent chambers in the intake system of the engine. This auxiliary air distribution pipe is connected and communicates to an auxiliary air channel so as to bypasses an intake throttle valve. In this auxiliary air channel an auxiliary air control valve is installed to controls the volume of auxiliary air flowing through the channel, according to the operating condition of the engine. Because of this, the auxiliary air controlled by the control valve is directly distributed to two or more chambers through the auxiliary air distribution pipes.

BRIEF DESCRIPTION OF THE DRAWINGS

These and other objects, features, and advantages of the present invention will be more apparent from the following description of a preferred embodiment, taken in conjunction with the accompanying drawings, in which.

DETAILED DESCRIPTION OF THE PREFERRED EMBODIMENTS

Figure 1:
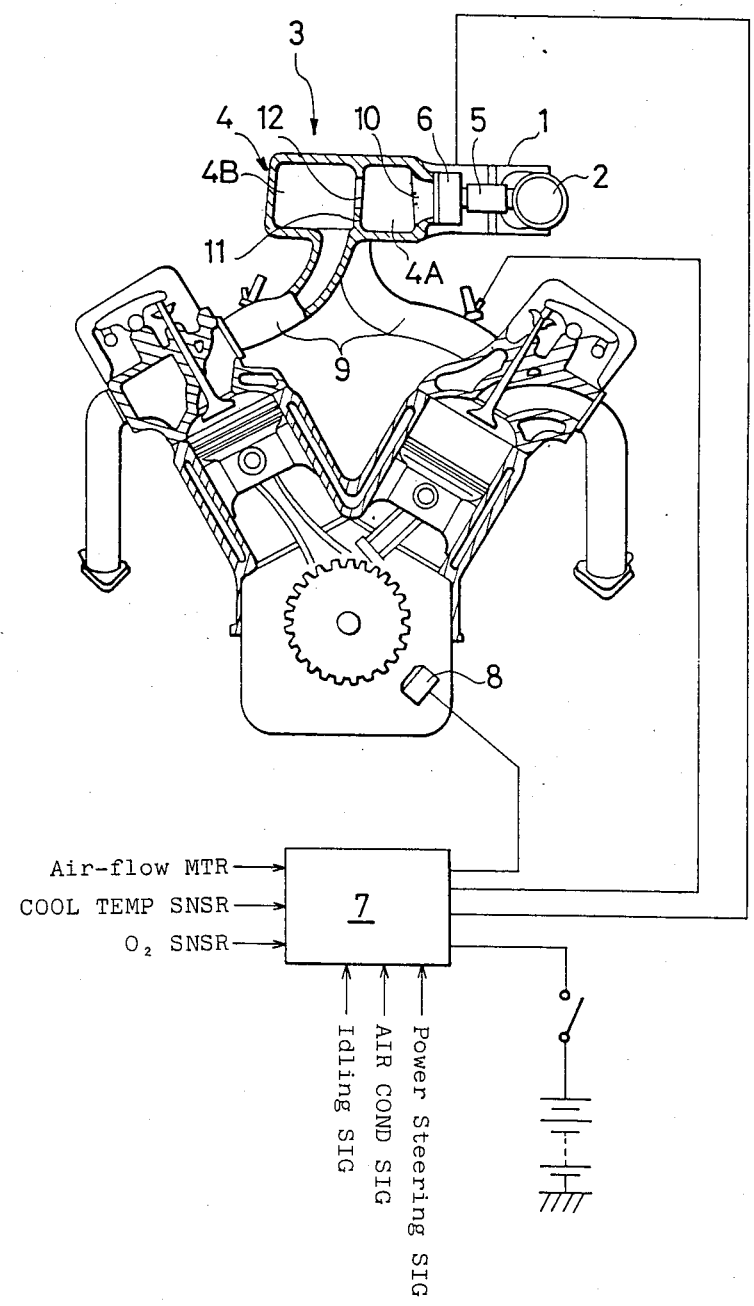
FIG. 1 is an schematic side view of a V-type internal combustion engine using a conventional auxiliary air supply apparatus.
Figure 2:
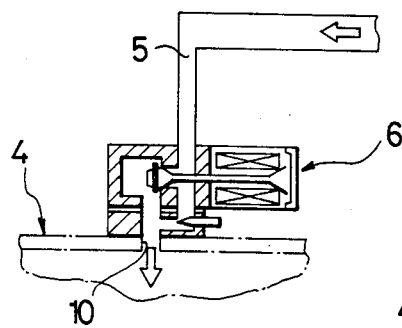
FIG. 2 is an schematic cross-sectional view of the auxiliary air supply apparatus shown in FIG. 1.
Figure 3:
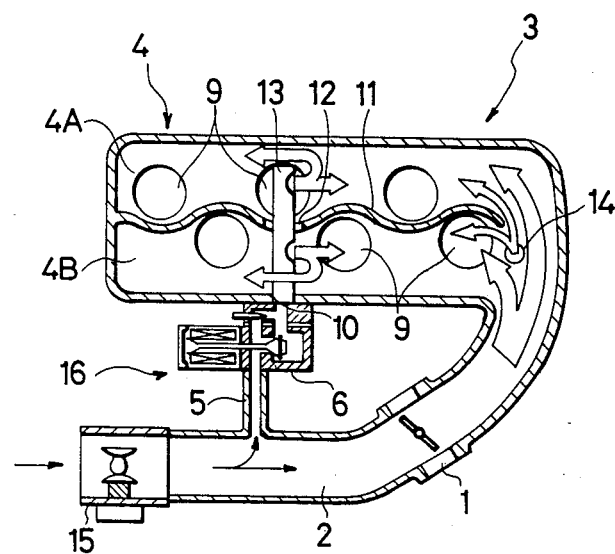
FIG. 3 is a cross-sectional view of the auxiliary air supply apparatus embodying the present invention.

Referring now to FIG. 3, an embodiment of the auxiliary air supply apparatus of the present invention is indicated by reference number 16 and is installed on an intake manifold 3 mounted on a V-type, 6-cylinder engine. A collector section 4 of the intake manifold 3 is divided internally by a partition 11 into a first chamber 4A and a second chamber 4B. The first chamber 4A communicates to three branched pipes 9 which run to three cylinders on one side of the engine. The second chamber 4B communicates to three branched pipes 9 which run to three cylinders on the other side of the engine. In the central section of the partition 11 a balancing hole 12 is formed which allow communication between the first chamber 4A and the second chamber 4B. Then, on one side of the external wall of the collector section 4, an auxiliary air supply port 10 is provided in the location corresponding to the balancing hole 12.

The auxiliary air supply apparatus 16 is equipped with an auxiliary air distribution pipe 13 as an auxiliary air distributing means which penetrates into the two chambers 4A and 4B of the inner section of the collector section 4, passing through the auxiliary air supply port 10 and the balancing hole 12. The auxiliary air distribution pipe 13 connects to an auxiliary air channel 5, thereby communicating to the upstream side of an intake duct 2 through an auxiliary air control valve 6. The degree of opening of the auxiliary air control valve 6, or the proportion of the time that the valve is open, is increased when the engine is idling and when auxiliary devices are running. By means of this action, the volume of auxiliary air supplied to the engine through the auxiliary air channel 5 is increased.

In addition, the auxiliary air control valve 6 is controlled so that it is completely opened while the vehicle is travelling. Therefore, one quarter to three quarters of the volume of air required when travelling at a fixed speed of 40 km/hr is supplied to the engine through the auxiliary air channel 5.

Figure 4A:
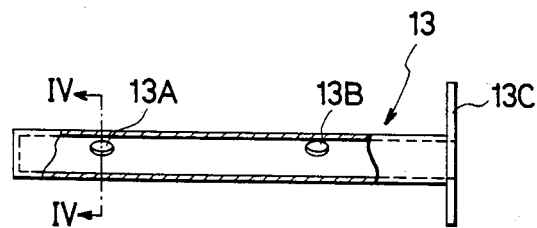
FIG. 4A is a partial cut-away front elevation of an auxiliary air distribution pipe of the auxiliary air supply apparatus shown in FIG. 3.
Figure 4B:
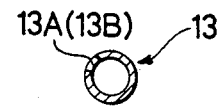
FIG. 4B is a cross-sectional view along the line IV—IV of FIG. 4A.

As shown in FIGS. 4A and 4B, the auxiliary air distribution pipe 13 is in the form of a tube, closed off at one end, and has a flange 13C mounted on its open end. The closed end of the auxiliary air distribution pipe 13 extend through the first chamber 4A and the balancing hole 12, and is positioned in the second chamber 4B. The auxiliary air distribution pipe 13 has auxiliary air distribution ports 13A and 13B respectively, in the positions corresponding to the first and second chambers 4A and 4B. The auxiliary air distribution ports 13A and 13B are faced to and slanted in the direction of the upper part of the upstream side of the intake.

In addition, a discharge port 14 for exhaust recycle gas is provided in the collection section 4 of the upstream side of the first and second chambers 4A and 4B. A hot-wire type air flowmeter 15 is provided in the upstream side of the intake duct 2.

Next, the operation of the auxiliary air supply apparatus of the present invention is explained.

When the engine is under low load, the intake throttle valve is controlled close to the closed position. After the inlet air is measured by the air flowmeter, one part is fed to the auxiliary air control valve 6 of the auxiliary air channel 5, while the rest is fed to the intake throttle valve in a throttle chamber, 1. At this time, the volume of the auxiliary bypass air passing through the auxiliary air control valve 6 is controlled by the control valve 6 according to the operating condition of the engine. Then, the controlled auxiliary air passes through the auxiliary air distribution pipe 13 and is directly supplied to the first and second chambers 4A and 4B of the collector section 4 through the auxiliary air distribution ports 13A and 13B of the auxiliary air distribution pipe 13. Therefore, the auxiliary air is uniformly distributed and fed into the first and second chambers 4A and 4B.

In addition, by uniformly distributing the auxiliary air as described above, the air pressure within the first and second chambers 4A and 4B is also uniform. As a result, the exhaust recycle gas fed from the discharge port 14, which is opened in the upstream side of the collector section 4, is also uniformly distributed in the first and second chambers 4A and 4B.

Furthermore, because the auxiliary air distribution ports 13A and 13B are opened so that they are faced to and slanted in the direction of the upper part of the upstream side of the intake, the distribution of the auxiliary air into each of the branched pipes 9 in the first and second chambers 4A and 4B is also uniform. In a similar manner, the auxiliary air and the exhaust recycle gas are uniformly distributed in each cylinder of the intake group. Because of this, the ratio of the mixture in all the cylinders is uniform and the operability and fuel costs are improved.

In addition, there is the advantage that the auxiliary air distribution pipe 13 can be easily installed and used in the existing auxiliary air supply port 10 and the balancing hole 12. Furthermore, the intake manifold 3 is divided into the first and second chambers 4A and 4B to provide the two intake groups, the low speed torque can be improved on the one hand, while output at high speed is also increased.

In this embodiment of the present invention, one auxiliary air supply port of the auxiliary air distribution pipe is provided for each chamber, but there is no limit to the number of ports or to the diameter of each port.

Figure 5:
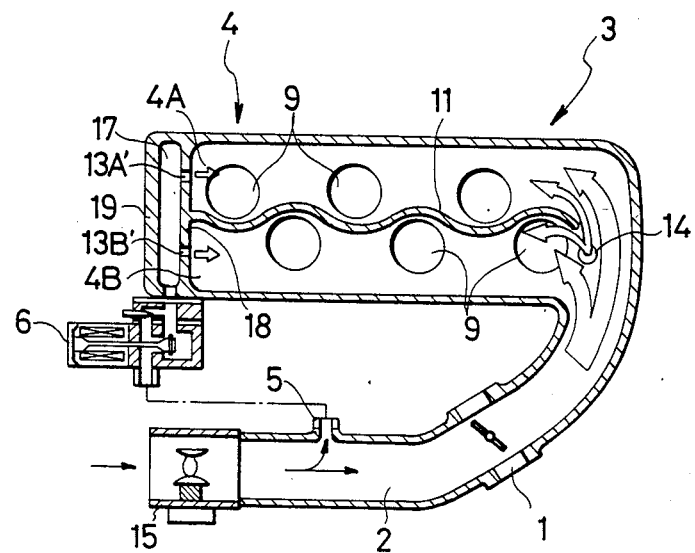
FIG. 5 is a cross-sectional view of another embodiment of the auxiliary air supply apparatus according to the present invention.

Referring to FIG. 5, there is shown another embodiment of the auxiliary air supply apparatus of the present invention. In this embodiment, the same parts and elements as those shown in FIG. 3 will be designated by the same reference numerals and will not be described any further for the sake of simplicity. This embodiment is similar to the first embodiment in the function but differs therefrom concerning the construction of the auxiliary air distributing means. The auxiliary air distributing means of this embodiment comprises an air passageway 17 which is formed at an end wall 18 of the collector section 4. The air passageway 17 is defined by the end wall 18 and an external wall 19. The end wall 18 has auxiliary air distrubition ports 13A' and 13B' in the positions corresponding to the first and second chambers 4A and 4B. The downstream end of an auxiliary air channel 5 communicate and connect to the passageway 17 through an auxiliary air control valve 6. With this arrangement, the manufacturing process of the apparatus is simplified.

In summary, because an auxiliary air distribution pipe is provided which directly distributes and supplies auxiliary air to two or more chambers within the intake manifold, the inlet air is uniformly distributed to each intake group and to each cylinder, especially when the engine is running under low load. Then, because the distribution of the exhaust recycle gasses and the ratio of the mixture are uniform, the operability, fuel costs, and exhaust emissions are improved.

Other objects and further scope of applicability of the present invention will become apparent from the detailed description given above. It should be understood, however, that the detailed description of a specific example, while indicating a preferred embodiment of the invention, is given by way of illustration only, since various changes and modifications within the spirit and scope of the invention will become apparent from this detailed description to those skilled in the art.

What is claimed is:

1. In an internal combustion engine which includes an intake duct with a throttle valve and an intake manifold provided in the downstream side of the intake throttle valve, the intake manifold having a collector section the internal section of which is divided into a plurality of chambers, an auxiliary air supply apparatus for supplying auxiliary air to a plurality of cylinders of the engine, comprising:
   an auxiliary air channel bypassing the throttle valve for supplying the auxiliary air to the collector section of the intake manifold; and
   means for uniformly feeding and distributing the auxiliary air into the chambers of the collector section;
   wherein said auxiliary air distributing means comprises an auxiliary air distribution pipe which is connected to said auxiliary air channel and is arranged to directly supply the auxiliary air to the chambers of the collector section;
   wherein the internal section of the collector section is divided into the first and second chambers by a partition corresponding to the two groups of cylinders each group of which has a continuous ignition order;
   wherein the auxiliary air distribution pipe has auxiliary air distribution ports in the position corresponding to the first and second chambers, and
   wherein said auxiliary air channel has an inlet which communicates to the intake duct in the upstream side of the intake throttle valve and an outlet which communicates to the collector section of the intake manifold in the downstream side of the intake throttle valve, the auxiliary air distribution pipe is in the form of a tube and closed off at one end and has a flange mounted on its open end, the open end of the pipe being communicated to the outlet of said auxiliary air channel, the closed end of the pipe extending through the first chamber and a balancing hole of the partition and being positioned in the second chamber.

2. In an internal combustion engine which includes an intake duct with a throttle valve and an intake manifold provided in the downstream side of the intake throttle valve, the intake manifold having a collector section the internal section of which is divided into a plurality of chambers, an auxiliary air supply apparatus for supplying auxiliary air to a plurality of cylinders of the engine comprising:
   an auxiliary air channel bypassing the throttle valve for supplying the auxiliary air to the collector section of the intake manifold; and
   means for uniformly feeding and distributing the auxiliary air into the chambers of the collector section;
   wherein said auxiliary air distributing means comprises an auxiliary air distribution pipe which is connected to said auxiliary air channel and is arranged to directly supply the auxiliary air to the chambers of the collector section;
   wherein the internal section of the collector section is divided into the first and second chambers by a partition corresponding to the two groups of cylinders each group of which has a continuous ignition order;
   wherein the auxiliary air distribution pipe has auxiliary air distribution ports in the position corresponding to the first and second chambers; and
   wherein the auxiliary air distribution ports are faced and slanted in the direction of the upper part of the upstream side of the intake.

3. In an internal combustion engine which includes an intake duct with a throttle valve and an intake manifold provided in the downstream side of the intake throttle valve, the intake manifold having a collector section the internal section of which is divided into a plurality of chambers, an auxiliary air supply apparatus for supplying auxiliary air to a plurality of cylinders of the engine, comprising:
   an auxiliary air channel bypassing the throttle valve for supplying the auxiliary air to the collector section of the intake manifold; and
   means for uniformly feeding and distributing the auxiliary air into the chambers of the collector section;
   wherein said auxiliary air distributing means comprises an air passageway which is formed at an end wall of the collector section and connected to said auxiliary air channel for directly supplying the auxiliary air to the chambers of the collector section.

4. An auxiliary air supply apparatus as claimed in claim 3, in which the internal section of the collector section is divided into the first and second chambers by a partition corresponding to the two groups of cylinders each group of which has a continuous ignition order.

5. An auxiliary air supply apparatus as claimed in claim 3, in which the internal section of the collector section is divided into the first and second chambers by a partition corresponding to the two groups of cylinders each group of which has a continuous ignition order.

6. In an internal combustion engine which includes an intake duct with a throttle valve and an intake manifold provided in the downstream side of the intake throttle valve, the intake manifold having a collector section the internal section of which is divided by a partition into a plurality chambers each said chamber having conduits in fluid communication with the driven cylinders of said engine, an auxiliary air supply apparatus for supplying auxiliary air to said cylinders of the engine, comprising:
   an auxiliary air channel bypassing the throttle valve for supplying the auxiliary air to the collector section of the intake manifold; and
   a passage provided on the outlet of the auxiliary air channel and running through said partition, said passage being formed with air ports through which auxiliary air is supplied to said chambers.

7. An auxiliary air supply apparatus as claimed in claim 6, further comprising:
   an auxiliary air control valve for controlling the volume of the auxiliary air passing through said auxiliary air channel according to the operating condition of the engine.

8. An auxiliary air supply apparatus as claimed in claim 6, in which said passage comprises an air passageway which is formed at an end wall of the collector section and connected to said auxiliary air channel for directly supplying the auxiliary air to the chambers of the collector section.

9. An auxiliary air supply apparatus as claimed in claim 8, in which the internal section of the collector section is divided into the first and second chambers by a partition corresponding to the two groups of cylinders each group of which has a continuous ignition order.

10. An auxiliary air supply apparatus as claimed in claim 9, in which the end wall of the collecter section has auxiliary air distribution ports in the position corresponding to the first and second chambers.

11. An auxiliary air supply apparatus as claimed in claim 6, in which said passage comprises an auxiliary air distribution pipe which is connected to said auxiliary air channel and is arranged to directly supply the auxiliary air to the chambers of the collector section.

12. An auxiliary air supply apparatus as claimed in claim 11, in which the internal section of the collector section is divided into first and second chambers by said partition corresponding to the two groups of cylinders each group of which has a continuous ignition order.

13. An auxiliary air supply apparatus as claimed in claim 12, in which the internal combustion engine is a V-type internal combustion engine.

14. An auxiliary air supply apparatus as claimed in claim 13, in which the first chamber of the collector section is communicated to one group of the cylinders through branched pipes, the second chamber is communicated to the other group of the cylinders through branched pipes.

15. An auxiliary air supply apparatus as claimed in claim 12, in which the auxiliary air distribution pipe has auxiliary air distribution ports in the position corresponding to the first and second chambers.

16. An auxiliary air apparatus as claimed in claim 15, in which the auxiliary air distribution ports are faced and slanted in the direction of the upper part of the upstream side of the intake.

17. An auxiliary air supply apparatus as claimed in claim 15, in which said auxiliary air channel has an inlet which communicates to the intake duct in the upstream side of the intake throttle valve and an outlet which communicates to the collector section of the intake manifold in the downstream side of the intake throttle valve, the auxiliary air distribution pipe is in the form of a tube and closed off at one end and has a flange mounted on its open end, the open end of the pipe being communicated to the outlet of said auxiliary air channel, the closed end of the pipe extending through the first chamber and a balancing hole of the partition and being positioned in the second chamber.

18. An auxiliary air supply apparatus as claimed in claim 17, in which the internal combustion engine is a V-type 6-cylinder engine.

* * * * *